(12) United States Patent
Fischereder

(10) Patent No.: US 7,446,301 B2
(45) Date of Patent: Nov. 4, 2008

(54) SAFETY MECHANISM COMPRISING A HEIGHT-ADJUSTABLE HOLDING DEVICE

(75) Inventor: Bernhard Fischereder, Thalheim bei Wels (AT)

(73) Assignee: TRUMPF Maschinen Austria GmbH & Co. KG., Pasching (AT)

( * ) Notice: Subject to any disclaimer, the term of this patent is extended or adjusted under 35 U.S.C. 154(b) by 39 days.

(21) Appl. No.: 10/573,376

(22) PCT Filed: Sep. 27, 2004

(86) PCT No.: PCT/AT2004/000321

§ 371 (c)(1),
(2), (4) Date: Mar. 24, 2006

(87) PCT Pub. No.: WO2005/030410

PCT Pub. Date: Apr. 7, 2005

(65) Prior Publication Data

US 2007/0164200 A1 Jul. 19, 2007

(30) Foreign Application Priority Data

Sep. 26, 2003 (AT) .............................. A 1527/2003

(51) Int. Cl.
*B21D 55/00* (2006.01)
*B30B 15/28* (2006.01)
*F16P 3/14* (2006.01)

(52) U.S. Cl. ...................... 250/221; 250/222.1; 408/16; 72/21.3

(58) Field of Classification Search ................. 250/221, 250/559.12, 559.13, 222.1; 408/16; 72/21.3
See application file for complete search history.

(56) References Cited

U.S. PATENT DOCUMENTS 4,166,369 A 9/1979 Nakajima (Continued)

FOREIGN PATENT DOCUMENTS

DE 197 17 299 2/1998

(Continued)

OTHER PUBLICATIONS

The International Search Report for PCT Application No. PCT/AT2004/000321; Filed Sep. 27, 2004; Date of Completion Dec. 21, 2004; Date of Mailing Dec. 30, 2004.

*Primary Examiner*—John R Lee
(74) *Attorney, Agent, or Firm*—Alston & Bird LLP

(57) ABSTRACT

The invention relates to a safety device (45), in particular a beam-emitting and beam-receiving device, for a manufacturing machine (1), e.g. an edging press, with at least one retaining mechanism (51) for the safety device (45) designed as an adjusting mechanism (52) on a press beam (15,16) fitted with bending tools (36, 37) in a tool mounting device (35). By means of the retaining mechanism (51) designed as an adjusting mechanism (52) the beam emitter (47) and/or beam receiver (48) can be adjusted in a direction perpendicular to the standing surface (9) between at least one working position (55) and a park position (54), whereby in the park position (54) automatic locking takes place.

24 Claims, 6 Drawing Sheets

U.S. PATENT DOCUMENTS

| | | | |
|---|---|---|---|
| 5,588,766 A * | 12/1996 | Lai | 403/105 |
| 6,752,253 B2 | 6/2004 | Fiessler | |
| 6,786,145 B2 | 9/2004 | Kilian et al. | |
| 6,919,554 B2 | 7/2005 | Braune et al. | |
| 6,919,555 B2 * | 7/2005 | Fiessler | 250/221 |
| 2002/0104958 A1 | 8/2002 | Fiessler | |
| 2004/0020255 A1 * | 2/2004 | Kilian et al. | 72/1 |
| 2004/0237617 A1 | 12/2004 | Sperrer | |

FOREIGN PATENT DOCUMENTS

| | | |
|---|---|---|
| DE | 101 43 505 | 3/2003 |
| EP | 0 995 942 | 4/2000 |
| EP | 1 258 667 | 11/2002 |
| EP | 1 319 886 | 6/2003 |
| EP | 1 327 815 | 7/2003 |
| WO | WO 01/56720 | 8/2001 |
| WO | WO 01/92777 | 12/2001 |
| WO | WO 03/015951 | 2/2003 |

* cited by examiner

SAFETY MECHANISM COMPRISING A HEIGHT-ADJUSTABLE HOLDING DEVICE

BACKGROUND OF THE INVENTION

The invention relates to a safety device for a manufacturing machine such as a folding press.

From WO 01/56720 A1 of the same applicant a safety device for a manufacturing machine, e.g. a folding press, is known. This comprises a beam emitter and a beam receiver. The latter are secured by means of a retaining mechanism to a press beam that is adjustable by means of a drive unit relative to a stationary press beam and form a beam curtain directly in front of bending tools facing an operator which extends over the entire length of the press beam. The safety device is connected to the control device of the press by cable and if there is an interruption in the beam curtain it detects objects in the vicinity of the bending tools in order effectively to prevent the operator being put at risk. The retaining mechanism is detachably secured directly in a mounting device securing the bending tools.

The objective of the invention is to create a safety device, by means of which a tool on the manufacturing machine can be replaced with a simple adjustment of the safety device without taking the latter apart.

The objective of the invention is achieved by providing a safety device in which the adjusting mechanism has a guiding and locking device switching a locking element of a locking device between a released position and a retained position, and the retaining mechanism for the beam emitter and/or the beam receiver automatically locks in relation to the press beam in a park position upon a linear displacement in a direction opposite to the working plane on reaching the park position. The surprising advantage here is that by determining a park position for the retaining mechanism, depending on the overall adjustment range to a working position provided in a different position relative to the press beam, and determined by the different tool heights, an adjustment can be carried out easily and reliably in order to move elements of the safety device out of positions that hinder the refitting of the manufacturing device by means of the locking device that can be shifted in a linear adjustment.

A design is also possible in which the guiding and locking device is arranged on the adjustable press beam in a stationary manner, as in this case the adjustable retaining mechanism can be made to have a light structure.

An embodiment is also possible in which the guiding and locking device is arranged on the retaining mechanism in a stationary manner, whereby the retaining mechanism is given a modular structure.

According to further advantageous developments described herein, a simple technical construction is obtained which ensures a high degree of safety and can be manufactured economically.

In accordance with some embodiments, a variant is possible in which the guiding or locking device is arranged stationarily either on the press beam or on retaining means.

The present application also describes an advantageous design according to which a simple actuation of the locking element of the locking device is achieved, in which the locking element is pretensioned by means of a spring arrangement such as a compression spring acting between the locking element and a guide housing for the locking device, so that the locking element projects beyond a side surface of the guide housing in the direction of a stop and switching means, and wherein the stop and switching means forms an adjusting means that exerts an adjusting force on an end face of the locking element against the action of the spring arrangement.

According to the further advantageous designs in which the adjusting means is in the form of a retaining stop for supporting the locking element or the retaining mechanism, the components are simplified and thereby the assembly much facilitated.

A design in which a guide rail for the guiding and locking device is arranged in a housing sleeve formed by at least one section is also advantageous however, as in this way a closed unit is obtained and unauthorised intervention is prevented.

By arranging the safety device such that, at an end region facing the standing surface on the housing sleeve a support plate aligned parallel to the standing surface is arranged for the beam emitter and/or the beam receiver, the fitting of safety elements onto the safety device is simplified.

Designs are also advantageous in which lines are arranged in the housing sleeve for the transmission of energy and data between the beam emitter and/or the beam receiver and an output interface, in that the safety device can be attached easily to the machine control, whereby the assembly is simplified, and furthermore the safety device according to the invention is particularly suitable for subsequently fitting onto production devices that do not have this device.

By providing the safety device such that an adjustment path of the retaining mechanism starting from the park position can be adapted to various working positions by stop means such as pins insertable into the guide rail, the beam emitter and beam receivers can be set in preset positions that are set at different tool heights.

Finally, an effective, automatic locking can be achieved in a park or working position of the retaining device for the beam emitter and also the beam receiver and an adjustment into a deeper position, in accordance with other embodiments of the invention, by providing the locking device as a wedge element mounted adjustably in the housing of the guiding and locking device. This requires a conscious effort to carry out an unlocking procedure, which reduces the risk of error.

Furthermore, the design is technically of high standard.

BRIEF DESCRIPTION OF THE DRAWINGS

For a better understanding of the invention, the latter is described in more detail with reference to the exemplary embodiments illustrated in the figures.

DETAILED DESCRIPTION OF PREFERRED EMBODIMENTS

Figure 1:
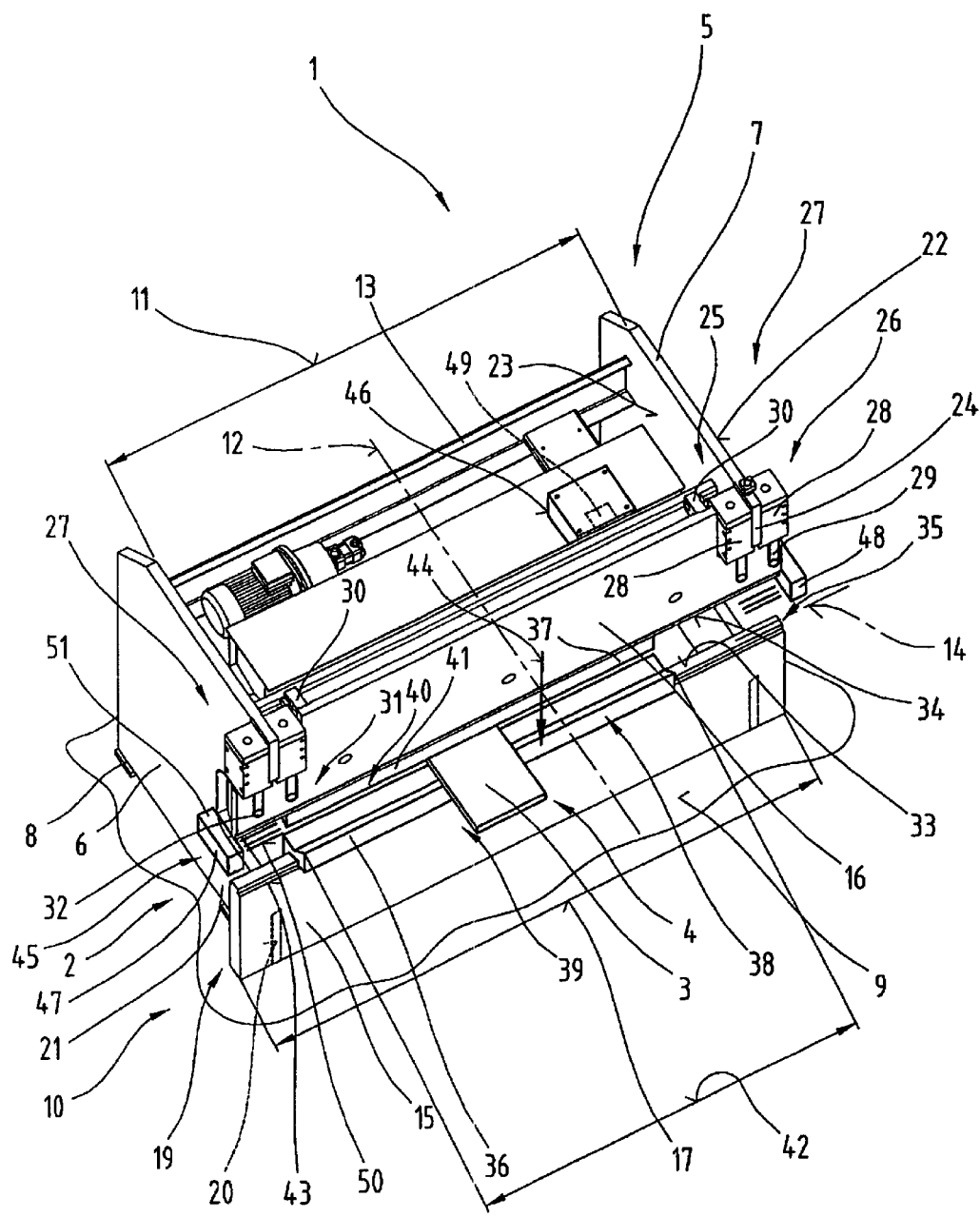
FIG. 1 shows a schematic view of a manufacturing machine with a safety device according to the invention.

Firstly, it should be noted that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described. Individual features or combinations of features from the different embodiments illustrated and described may be construed as independent inventive solutions or solutions proposed by the invention in their own right.

FIG. 1 shows a manufacturing machine 1, in particular an edging press 2, for shaping sheet metal parts 3 in particular, to make e.g. housing parts, sections, etc. Manufacturing machines 1 of this type are specifically used to make elongated sections 4, e.g. an angled section, U-section, Z-section, etc., where the lengths involved are generally long relative to the cross-sectional dimension.

A machine frame 5 of the manufacturing machine 1 essentially consists of two parallel C-shaped supporting side plates 6, 7, spaced at a distance apart from one another, which are supported directly, or if necessary via damping elements 8 for example, on a standing surface 9, or in another embodiment, as illustrated, mounted on a common bed plate 10, in particular welded to it. The supporting side plates 6, 7, are also joined to one another at a distance 11 by means of wall parts 13 perpendicular to a mid-plane 12.

With reference to a working plane 14 running parallel to the standing surface 9, the manufacturing machine 1 has two press beams 15, 16 lying opposite one another, which extend across a length 17 that is generally determined by the size of the machine or the working length provided for bending the sheet metal parts 3.

The press beam 15 facing the standing surface 9 is secured to the machine frame 5 by means of a fixing arrangement 19, preferably directly on end faces 20 of legs 21 of the C-shaped side plates 6, 7 assigned to the bed plate 10, in particular by means of a weld joint. Arranged on side faces 22, 23 of legs 24 of the C-shaped supporting side plates 6, 7 and spaced at a distance from the standing surface 9, are actuating drives 25, 26 of the drive arrangement, actuatable by a pressurising medium, provided in the form of double acting hydraulic cylinders 28. Actuating elements 29, e.g. piston rods, of the hydraulic cylinders 28, are drivingly linked, for example by means of articulated bearings 31 and bolts 32, to the press beams 16, which is mounted so as to be displaceable in guide arrangements 30 of the machine frame 5 in a direction running perpendicular to the working plane 14. The press beam 15 and the press beam 16 extend across the length 17 in a more or less symmetrical arrangement and in a direction perpendicular to the mid-plane 12, the length 17 being slightly longer than the distance 11.

On end faces 33, 34 directed towards one another and running parallel with the working plane 14, the press beams 15, 16 have tool holder devices 35 for supporting and releasably attaching bending tools 36, 37. In a manner known from the prior art, these bending tools 36, 37 are generally provided as a swage 39 in the form of a die 38 and a stamp 41 in the form of a punch 40. Also in a manner known from the prior art, the bending tools 36, 37 are divided into sections, so that the tool length 42 can be readily varied to adapt them to different requirements and facilitate refitting of the manufacturing machine 1 or changing bending tools 36, 37.

The tool holder devices 35 in the press beams 15, 16 are, firstly, designed for releasably attaching the bending tools 36, 37 and, secondly, constitute the supporting surfaces 43 for transmitting the bending forces—as indicated by arrow 44.

As may also be seen from FIG. 1, the manufacturing machine 1 is also provided with a safety device 45, which is wired to a machine control system 46 and consists of a beam emitter 47 and a beam receiver 48 and a control device 49 preferably integrated in the machine control system 46. The beam emitter 47 and the beam receiver 48 are joined to the displaceable press beam 16 so as to be non-displaceable and preferably designed to generate light beams 50. To monitor the safety of the entire working region, the light beams 50 are guided parallel with the tool path and across the entire length 17 of the press beams 15, 16. By preference, there are several light beams 50 running parallel with one another, which form a sort of curtain of light arranged in a plane running parallel with the standing surface 9. The beam emitter 47 and the beam receiver 48 are releasably connected by means of a retaining mechanism 51 to emitting and receiving optics facing one another in the end region on the displaceable beam 16.

Figure 2:
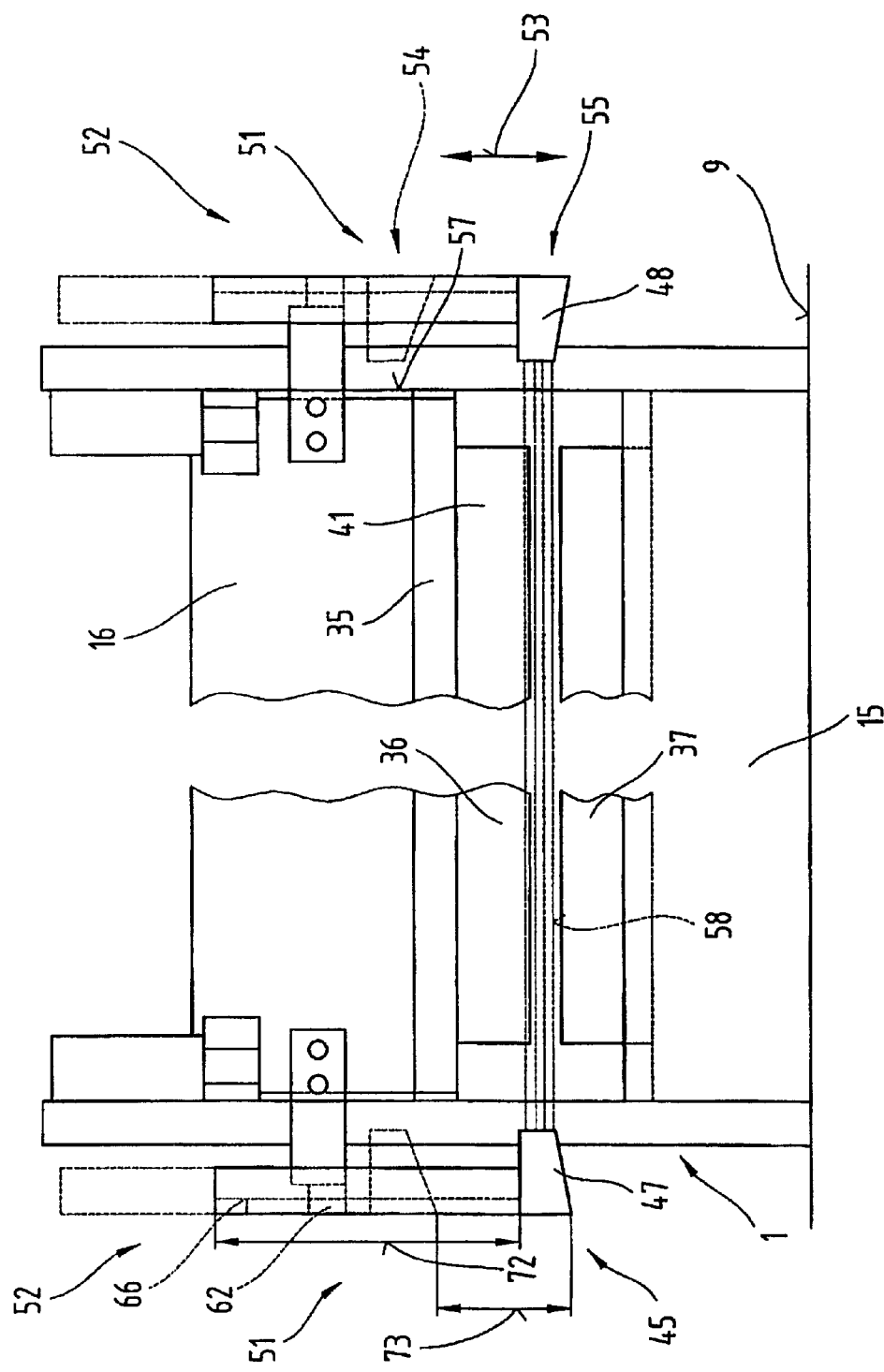
FIG. 2 shows a simplified view of the manufacturing machine with the safety device according to the invention.
Figure 3:
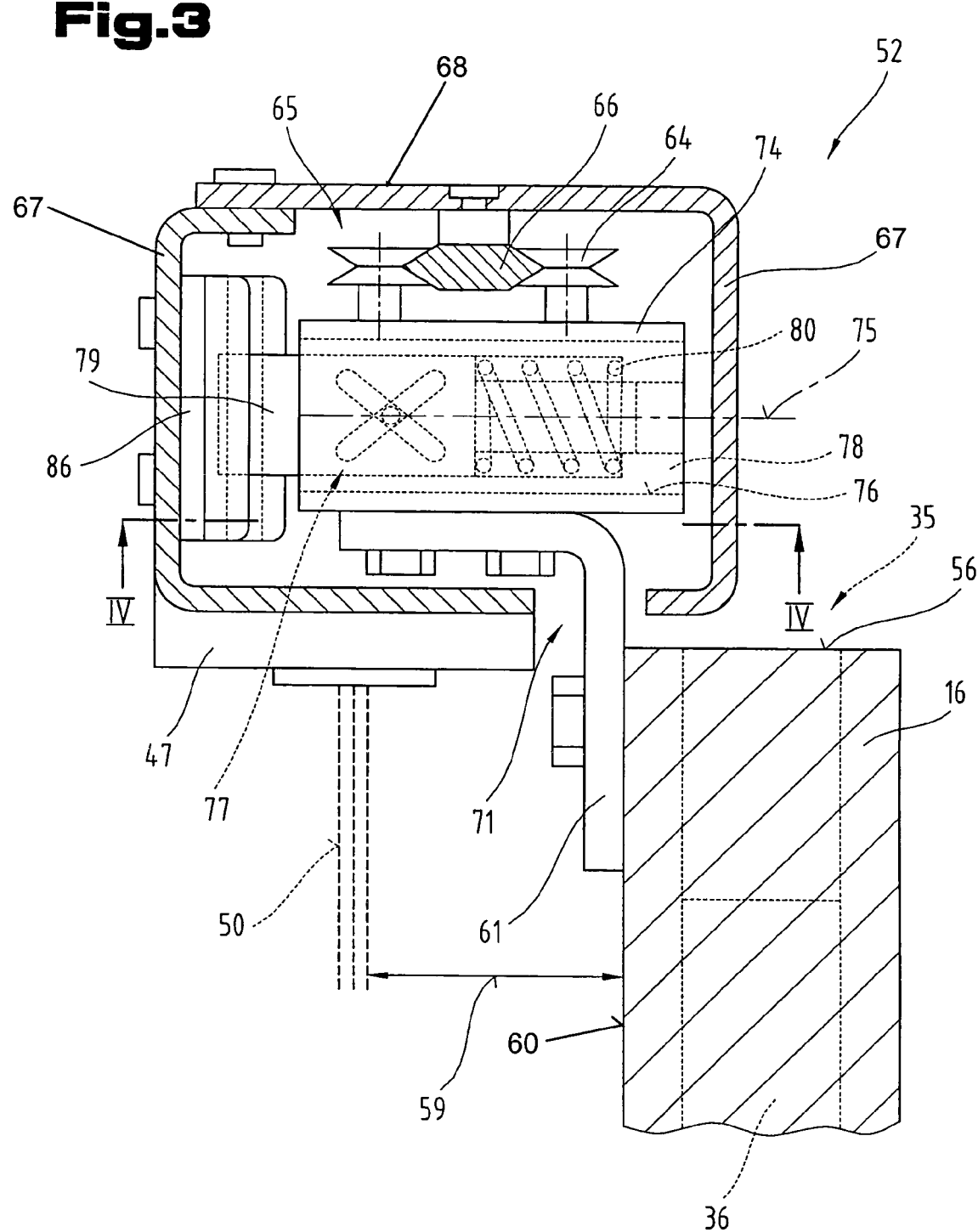
FIG. 3 shows a detailed view of the retaining mechanism of the safety device, in cross section along the lines III-III of FIG. 4.
Figure 4:
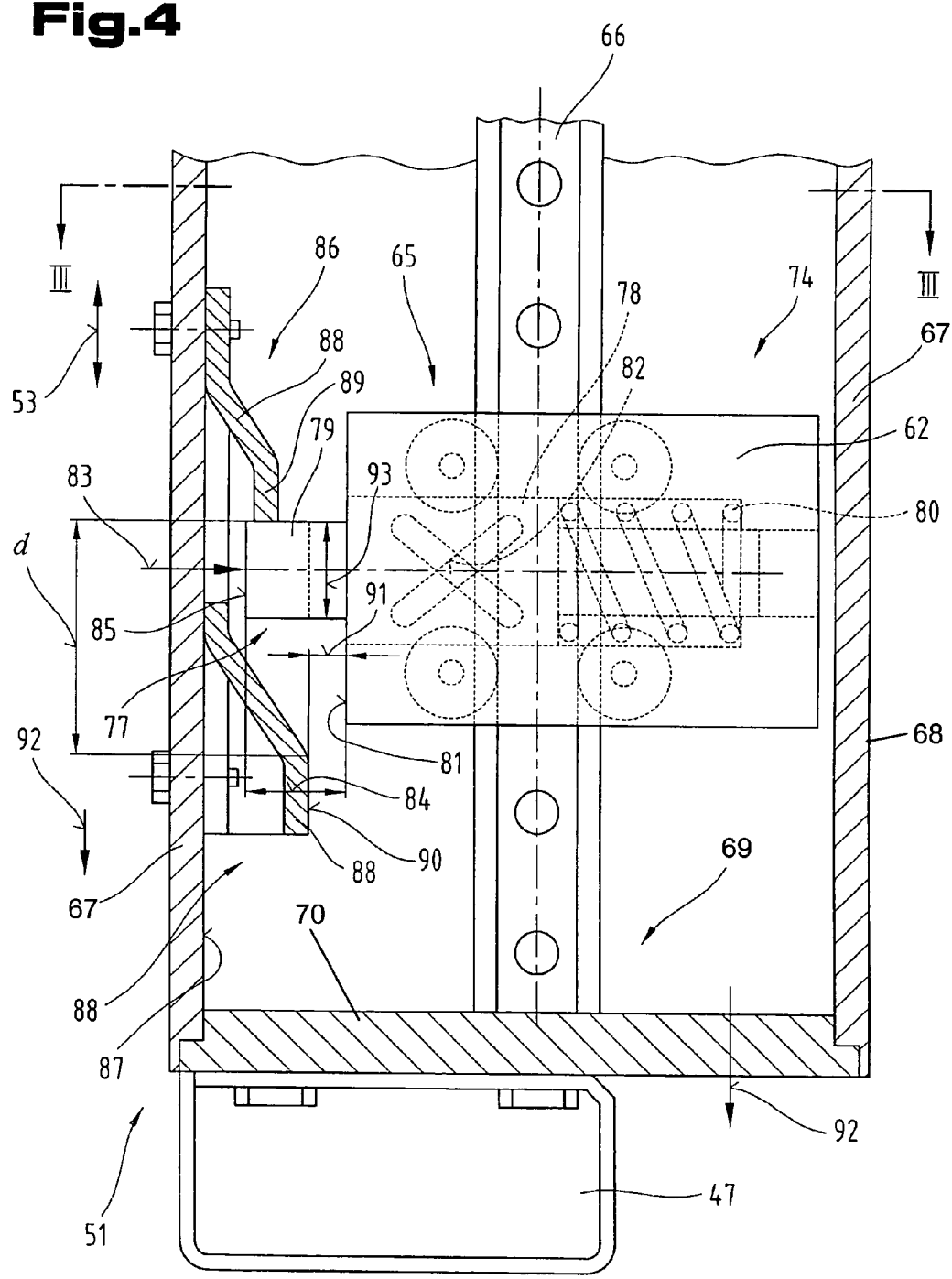
FIG. 4 shows the retaining mechanism, in cross section along the lines IV-IV of FIG. 3.

FIGS. 2 to 4 show in detail on the manufacturing machine 1 the safety device 45, comprising the beam emitter 47 and the beam receiver 48. The retaining mechanism 51 for positioning the beam emitter 47 and beam receiver 48 relative to the bending tools 36, 37 and thereby the working plane 14 are designed as adjusting mechanisms 52, which permit a simple adjustment of the beam emitter 47 and beam receiver 48 in a direction perpendicular to the standing surface 9, according to a double arrow 53, without the use of tools between a park position 54 shown by dashed lines and one or more working positions 55.

It should be mentioned that at least one adjusting mechanism 52 for the beam emitter 47 or the beam receiver 48 is provided. In the embodiment shown both the beam emitter 47 and the beam receiver 48 are connected with the adjustable press beam 16 via the retaining mechanism 51 provided with the adjusting mechanism 52 which is allocated to the essentially opposite end side faces 56, 57 of the press beam 16.

The safety device 45 with the beam emitter 47 and beam receiver 48 forms a beam curtain 58 at a given distance 59 from a surface 60 of the press beam 16 facing the operator at the level of the working plane 14.

The adjusting mechanisms 52 for the beam emitter 47 and the beam receiver 48 are, as shown from the mirror arrangement on the press beam 16, designed to be identical, whereby in the following description information as to whether the adjusting mechanism 52 is for the beam emitter 47 or the beam receiver 48 can be omitted.

The adjusting mechanism 52 forms according to the embodiment shown on the one hand a guiding and locking device 62 secured by a retaining angle 61 on the press beam 16, in particular its surface 60, with a guiding device 65 e.g. rollers 64 and on the other hand an adjustably mounted guide rail 66 running in the guiding device 65 perpendicular to the standing surface 9, which guide rail is arranged in a housing sleeve 68 formed by profiles 67. In an end region 69 facing the standing surface 9 on the housing sleeve 68 there is a support plate 70 for securing the beam emitter 47 or the beam receiver 48. The guide rail 66 and the guiding and locking device 62 are surrounded partly by the housing sleeve 68. For adjustments the housing sleeve 68 has a longitudinal slot 71 in the region of the projecting retaining angle 61. A length 72 of the guide rail 66, as of the housing sleeve 68 is greater than a maximum adjustment range 73 between the park position 54 and the working position 55.

In a block-shaped housing 74 of the guiding and locking device 62 with a mid-axis 75 running perpendicular to the surface 60 a bore 76 crossing the housing 74 is provided, in which a locking device 77 comprising a sleeve-shaped guiding housing 78 and a bolt shaped locking element 79 mounted adjustably therein is arranged. The locking element 79 is pretensioned by a spring arrangement 80, e.g. compression spring, in the direction of the housing sleeve 68 and projects over a side surface 81 of the housing 74 facing the housing sleeve 68.

Furthermore, the locking element 79 is mounted in the guide housing 78 rotatably about the mid-axis 75 in a sliding guide 82 of the housing element 78. With the application of an adjustment force according to arrow 83—in this way a combined linear and rotary movement of the locking element 79 is achieved, and by means of the design of the sliding guide 82 the locking element 79 adopts one of two given adjusting positions in adjustment direction, whereby an overhang 84 of an end face 85 of the locking element 79 relative to the side face 81 of the housing 74 is varied or can be adjusted in two positions.

Locking devices of this kind 77, in which a bolt-shaped locking element 79 can be adjusted with actuation in the direction of a mid-axis between two extended positions are known from the prior art, for example according to this principle the actuation of a ballpoint pen cartridge functions by means of a pressure bolt. In addition, similar solutions are known in the field of furniture fittings for folding doors, glass doors etc. Therefore, a more detailed description of the mechanics required is not necessary.

In order to operate the locking device 77 or the locking element 79 in the housing sleeve 68, facing the end face 85 of the locking element 79 there is a stopping and switching means 86 which forms two adjusting means 88 spaced apart from one another in adjusting direction according to double arrow 53 and inclined to an inner surface 87 of the housing sleeve 68, which adjusting means project over the inner surface 87 in the direction of the end face 85 of the locking element 79, whereby an adjusting means 88 forming a retaining stop 89 has a greater distance from the side face 81 of the housing 74, and the additional adjusting means 88 facing the end region 67 of the retaining mechanism 51 with a switching surface 90 running parallel to the side surface 81 has a smaller distance 91 from the side surface 81.

For the functioning of the locking device 77 it should be noted that the latter permits an adjustment of the safety device 45 or the beam emitter 47 and/or beam receiver 48 by means of single-handed operation between the working position 55 and park position 54 and vice versa without tools or disassembly.

In this way a rapid refitting of the press beam 16 is made possible by the fitting of the tool holder device 35 via the freely accessible end side surface 56, in particular for larger and heavier bending tools 36, 37. Once the refitting is complete an equally simple adjustment can be made into the working position 55 by means of single-handed operation.

Located in the position of the locking element 79 shown in FIG. 4 is the retaining mechanism 51, for example with the beam emitter 47 in the so-called park position 54. In this case the bolt-shaped locking element 79 is in an extended position relative to the side face 81 of the housing 74. The housing sleeve 68 with the beam emitter 47 is supported by the protruding retaining stop 89 on the locking element 79. In order to lower the beam emitter 47 into the working position 55—according to arrow 92—there is firstly a lifting of the retaining mechanism 51, whereby the locking element 79 is moved by the inclined adjusting means 88 and then the switching surface 90 into a retracted position against the effect of the spring arrangement 80, and by means of the sliding guide 82 locks between the locking element 79 and the guide housing 78 in the retracted position. In this way the downwards movement in the direction—according to arrow 92—into the working position 55 can be performed without the locking element 79 colliding with the retaining stop 89.

In order to adopt the park position 54 again from the lowered working position 55 a lifting up is carried out, whereby by means of a new contact between the adjusting means 88 and/or its switching surface 90 and the locking element 79 the unlocking procedure takes place and the locking element 79 after a slight lowering of the retaining mechanism 51 adopts the extended position, and thereby the retaining stop 89 can be used.

It is essential in this case that the distance d between the retaining stop 89 and the switching surface 90 measured in adjusting direction —according to the double arrow 53 —is greater than a diameter 93 of the locking element 79.

With respect to the aforementioned locking device 77 with the locking element 79 it is also noted, that other solutions known from the prior art, e.g. locking elements in the form of a hook can be used, such as for example in the case of flaps on wall cupboards which are to be opened upwards and held in the open position. Here too single-handed operation is achieved in which by means of lifting the flap slightly further the locking element is moved into its position of rest by spring force and thus the flap can be pivoted into its closed position.

It should also be mentioned that by means of stopping means that can be moved easily and as necessary, e.g. pins that can be inserted into given positions on the guide rail 66, different operating positions adapted to the required heights of the bending tools 36, 37 can be easily achieved without the effort of manoeuvring or manipulation after refitting.

Figure 5:
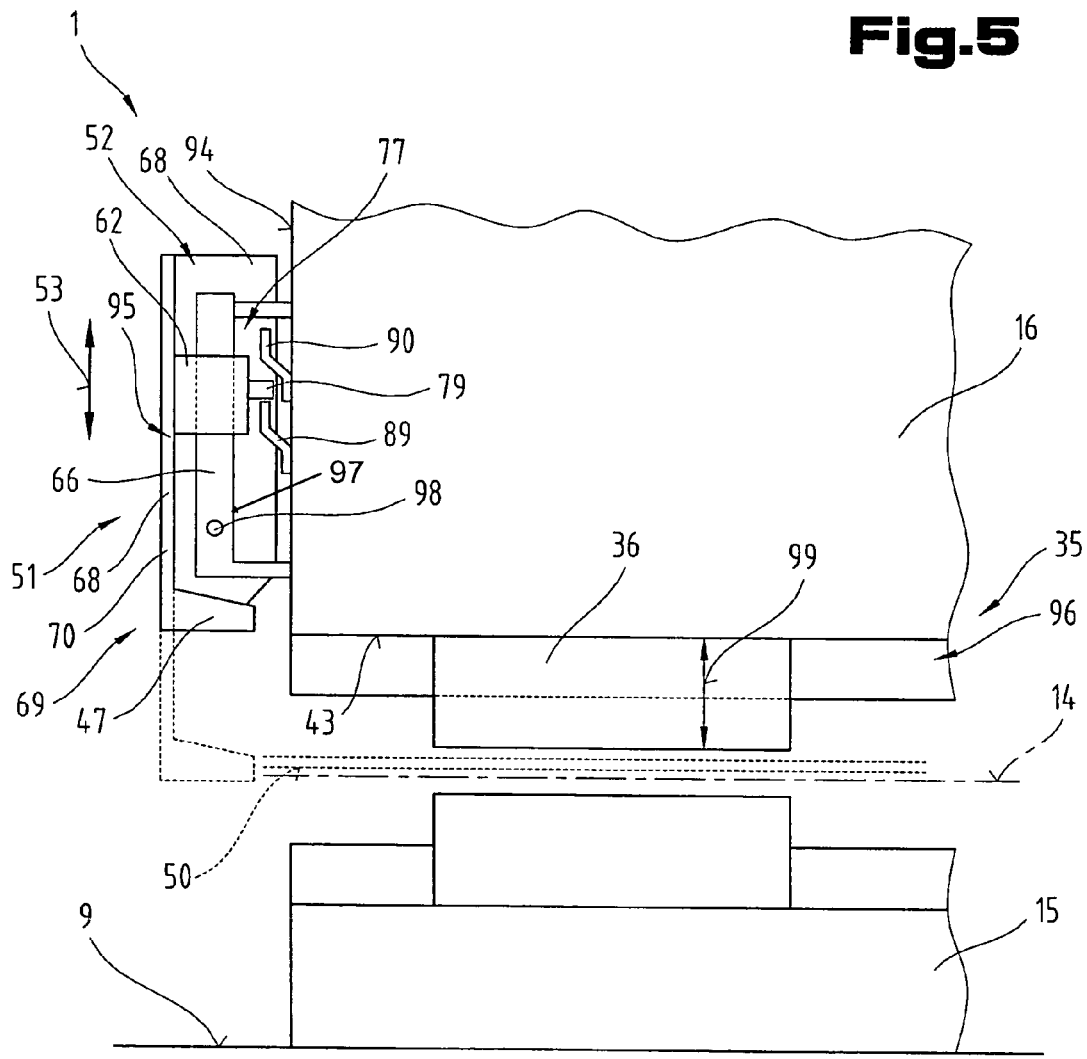
FIG. 5 shows a different design of the safety device on a manufacturing machine in a simplified view.

In FIG. 5 a further design of the retaining mechanism 51 with the adjusting mechanism 52 on the adjustable press beam 16 of the manufacturing machine 1 is shown. According to this design on at least one end side face 94 of the press bar 16 a linear guide 95, e.g. the guide rail 66, is secured and thus moveably connected with the press beam 16, whereby the relative position of the beam emitter 47 and/or the beam receiver 48 and thus the light beams 50 is set in a fixed position relative to the working plane 14 or in relation to the bending tool 36 arranged in the adjustable press beam 16.

On the guiding rail 66 the guiding and locking device 62 is mounted adjustably in a direction perpendicular to the standing surface 9—according to the double arrow 53—and thus relative to the press beam 16. The beam emitter 47 and/or the beam receiver 48 is connected via the housing sleeve 68 with the guiding and locking device 62. Facing the guiding and locking device 62 formed on the end side face 94 of the press beam 16 the stopping and switching means 86 is secured by the retaining stop 89 and the adjusting means 88 for the actuation of the locking element 79 of the locking device 77.

As can be seen in FIG. 5 the attachment of the stop and switching means 86 on the press beam 16 and the arrangement of the guiding and locking device 62 in the housing sleeve 68 with the beam emitter 47 and/or beam receiver 48 secured theronto is coordinated, so that on adopting the locked park position 54—one plane, in which the support surface 43 of a groove-shaped mount 96 of the tool holder device 35 runs, is not overlapped by the beam emitter 47 in the direction of the working plane 14, i.e. the mount 96 is freely accessible from the end side face 94, whereby a lateral introduction of the bending tool 36 and thus fitting the press beam 16 with auxiliary devices is achieved in particular with larger and heavier bending tools 36.

As already mentioned it is possible with variable stopping means 97, e.g. pins 98 insertable into the guide rails 66, to select different working positions 55, such as e.g. a position shown by dashed lines, according to a variable height 99 of the bending tool 36, and thereby to achieve the lowered positioned of the retaining mechanism 51 and thus the beam emitter 47 and/or beam receiver 48 relative to the press beam 16 in the direction of the standing surface 9.

Figure 6:
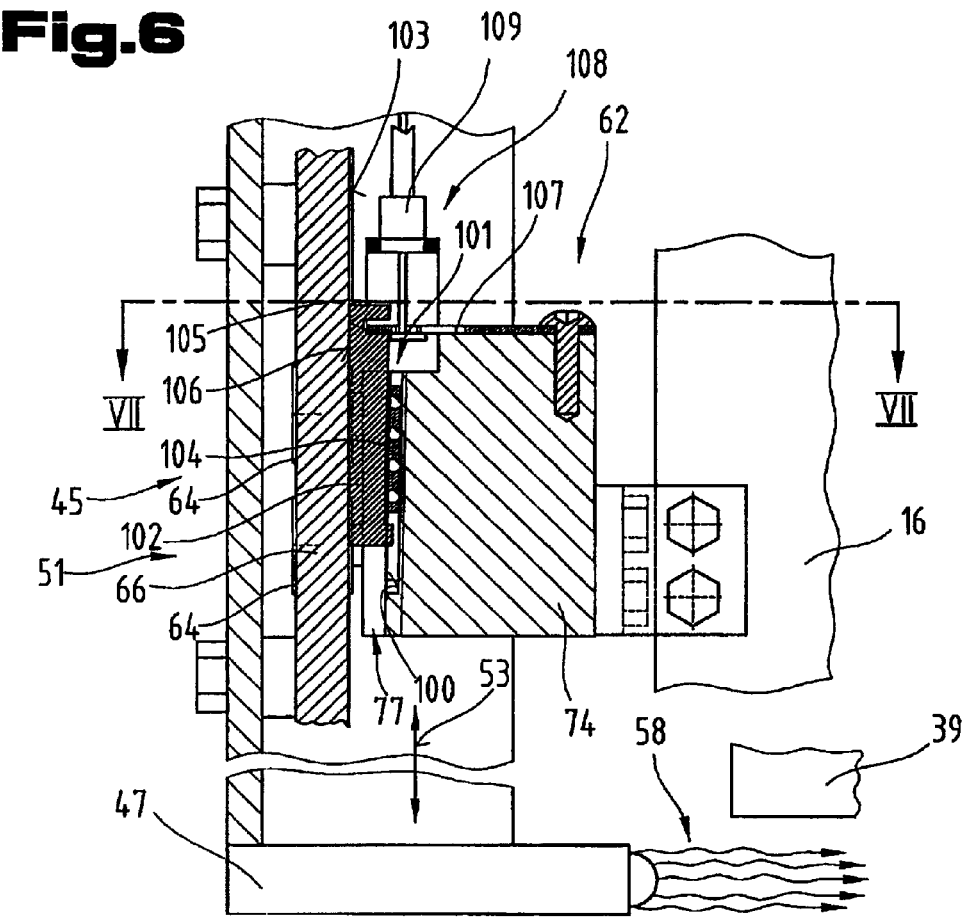
FIG. 6 shows a different design of the safety device according to the invention in cross section along the lines VI-VI of FIG. 7.
Figure 7:
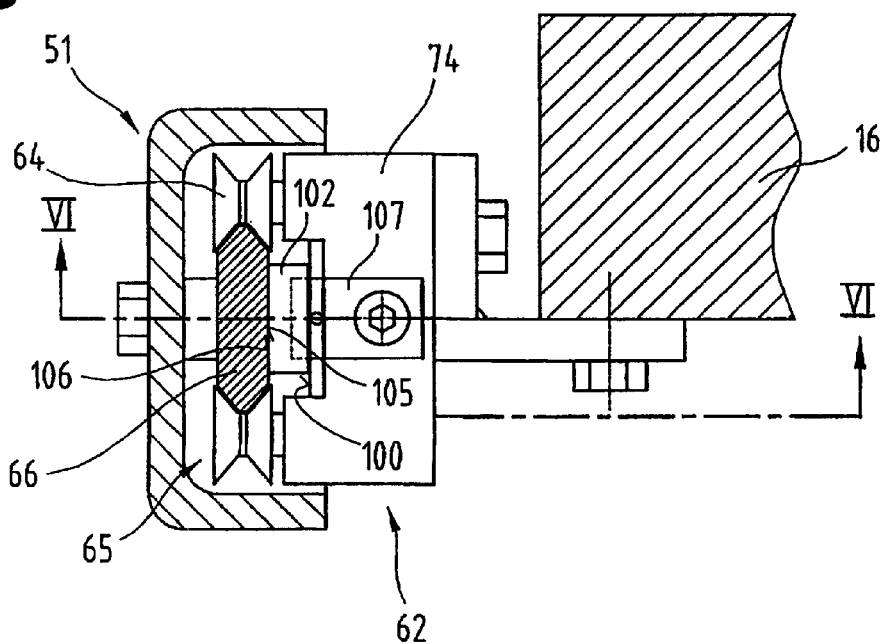
FIG. 7 shows the safety device in cross section, along the lines VII-VII of FIG. 6.

In FIGS. 6 and 7 a further design of the guiding and locking device 62 of the safety device 45 is shown. As already described in the preceding figures, by means of a beam curtain 58 between a beam emitter 47 and the opposite beam receiver not shown in FIGS. 6 and 7, a known measure is used to stop the movement of the adjustable press beam 16 if there is an interruption in the beam curtain 58. In order to guarantee safety it is necessary to set the beam curtain 58 to the position of the bending tool 39. This permits in a simple manner the guiding and locking device 62 with the adjustable retaining mechanism 51 for the beam emitter 47 and also the opposite beam receiver. In the embodiment shown the retaining mechanism 51 comprises the guide rail 66 and is guided by the latter in the guiding apparatus 65 of the housing 74 in the form of rollers 64 in adjusting direction—according to double arrow 53. The locking device 77 is formed in this embodiment by a wedge element 102 in the housing 74 secured to the adjustable press beam 16 that is adjustable in a guide track 100 of a guide 101 of the housing 74, which wedge element is arranged in a wedge gap between a support face of the housing 74 and a surface 103 of the guide rail 66 opposite thereto. The guide track 100 runs according to a wedge draw-in of the wedge element 102 inclined or at a wedge angle to the surface 103. Between the wedge element 102 and the guide track 100 are roller elements 104 for avoiding friction between the wedge element 102 and the guide track 100. A high degree of friction acts on opposite bearing surfaces 105, 106 between the wedge element 102 and the surface 103. In this way in a downwards movement of the retaining mechanism 51 the wedge element 102 is taken into the wedge gap and produces a clamp hold, which automatically prevents a further downwards movement of the retaining mechanism 51. In order to compensate for play the wedge element is pretensioned by a leaf spring 107 into the wedge gap, whereby a low amount of spring force is sufficient. In order to remove the clamping effect for an intended adjustment of the retaining mechanism 51 into a working position, an adjusting means 108, e.g. a rope pull 109, is provided by means of which the wedge element 102 is slightly raised against the effect of the spring force of the leaf spring 107. Due to the thus achieved reduction in the clamping effect the retaining mechanism 51 can be moved into a lowered position. The reverse movement of the retaining mechanism—i.e. into the upper park position—is possible without activating the adjusting means 108, as with an upwards movement of the retaining mechanism 51 with the various frictional values with such a movement the clamping effect is automatically reduced.

It is noted in general that the described retaining mechanism 51 with the adjusting mechanism 52 can be used both for the beam emitter 47 and the beam receiver 48. It is however also possible to provide the retaining mechanism 51 with the adjusting mechanism 52 for only one of the two devices.

The exemplary embodiments show possible variants of the manufacturing machine with the safety device that is adjustable by means of a retaining mechanism and adjusting mechanism, whereby it should be noted at this point that the invention is not restricted to the specific embodiments illustrated but rather various different combinations of the individual embodiments are possible, and the possible variations due to the technical teaching of the present invention lie within the ability of one skilled in this technical field. In addition, all conceivable embodiment variants which are possible due to combinations of individual details of the embodiment variant shown and described, are also covered by the scope of the invention.

Lastly, for form's sake it should be noted that in order to provide a clearer understanding of the structure of the safety device, the latter and its constituent parts have been illustrated untrue to scale to a certain extent and/or on an enlarged and/or reduced scale.

The objective underlying the independent inventive solutions can be taken from the description.

Above all, the individual designs shown in FIGS. 1; 2 to 4; 5; 6 and 7 can form the subject matter of independent solutions according to the invention. The tasks and solutions relating thereto can be taken from the detailed descriptions of these figures.

The invention claimed is:

1. Safety device comprising a beam emitter and/or beam receiver for a manufacturing machine with at least one retaining mechanism designed in the form of an adjusting mechanism for the safety device on a press beam which can be fitted with bending tools in a tool mounting device, wherein the adjusting mechanism holds the beam emitter and/or beam receiver in a guiding arrangement that allows the beam emitter and/or beam receiver to be adjusted relative to the press beam along a first direction running perpendicular to a standing surface between at least one working position and a park position, wherein the park position is relatively farther in the first direction away from a working plane of the manufacturing machine than is the working position, wherein the adjusting mechanism has a guiding and locking device switching a locking element of a locking device between a releasing position that allows said adjustment along the first direction and a retaining position that prevents said adjustment along the first direction, and the retaining mechanism for the beam emitter and/or the beam receiver automatically switches the locking element to the retaining position and locks the beam emitter and/or beam receiver in the park position fixed in relation to the press beam upon a linear displacement of the beam emitter and/or beam receiver in the first direction away from the working plane to or past the park position, the locking element being arranged in a guide housing arranged in a bore of a housing of the guiding and locking device, and the locking element being pretensioned by means of a spring arrangement acting between the locking element and the guide housing projecting over a side surface of the housing in the direction of a stop and switching means.

2. Safety device according to claim 1, characterised in that the guiding and locking device is arranged on the adjustable press beam in a stationary manner.

3. Safety device according to claim 1, characterised in that the guiding and locking device is arranged on the retaining mechanism in a stationary manner.

4. Safety device according to claim 1, characterised in that the locking element in the guiding and locking device is arranged to be adjustable in a direction running perpendicular to the retaining mechanism.

5. Safety device according to claim 1, characterised in that the locking element is adjustably mounted in the guide housing by means of a sliding guide.

6. Safety device according to claim 1, characterised in that the stop and switching means is secured onto the retaining mechanism.

7. Safety device according to claim 1, characterised in that the stop and switching means is secured onto the press beam.

8. Safety device according to claim 1, characterised in that a guide rail for the guiding and locking device is connected moveably with the press beam.

9. Safety device according to claim 8, characterised in that the guide rail is connected moveably with the retaining mechanism.

10. Safety device according to claim 1, characterised in that the stop and switching means on displacement of the guiding and locking device in a displacement direction forms an adjusting means triggering an adjusting force on an end face of the locking element in the extension direction of a middle axis against the action of the spring arrangement.

11. Safety device according to claim 10, characterised in that the adjusting means is in the form of a retaining stop for supporting the locking element or the retaining mechanism in the direction of the standing surface.

12. Safety device according to claim 11, characterised in that at a distance measured in the displacement direction of the retaining mechanism from the retaining stop in the direction of the standing surface, an additional adjusting means forming a switching surface running parallel to the displacement direction is arranged.

13. Safety device according to claim 11, characterised in that the stop and switching means forming the adjusting means is in the form of a one piece sheet metal part.

14. Safety device according to claim 8, characterised in that the guide rail with the guiding and locking device is arranged in a housing sleeve formed by at least one section.

15. Safety device according to claim 14, characterised in that at an end region facing the standing surface on the housing sleeve a support plate aligned parallel to the standing surface is arranged for the beam emitter and/or the beam receiver.

16. Safety device according to claim 14, characterised in that in the housing sleeve for the transmission of energy and data, lines are arranged between the beam emitter and/or the beam receiver and an output interface.

17. Safety device according to claim 16, characterised in that the lines are laid on a line guiding chain arranged in the housing sleeve.

18. Safety device according to claim 16, characterised in that the output interface is line-connected with the machine control system.

19. Safety device according to claim 8, characterised in that an adjustment path of the retaining mechanism starting from the park position to position the beam emitter and beam receiver can be adapted to various working positions by stop means to different heights of the bending tools.

20. Safety device comprising a beam emitter and/or beam receiver for a manufacturing machine with at least one retaining mechanism designed in the form of an adjusting mechanism for the safety device on a press beam which can be fitted with bending tools in a tool mounting device, wherein the adjusting mechanism holds the beam emitter and/or beam receiver in a guiding arrangement that allows the beam emitter and/or beam receiver to be adjusted relative to the press beam along a first direction running perpendicular to a standing surface between at least one working position and a park position, wherein the park position is relatively farther in the first direction away from a working plane of the manufacturing machine than is the working position, wherein the adjusting mechanism has a guiding and locking device switching a locking element of a locking device between a releasing position that allows said adjustment along the first direction and a retaining position that prevents said adjustment along the first direction, and the retaining mechanism for the beam emitter and/or the beam receiver automatically switches the locking element to the retaining position and locks the beam emitter and/or beam receiver in the park position fixed in relation to the press beam upon a linear displacement of the beam emitter and/or beam receiver in the first direction away from the working plane to or past the park position, the locking element being arranged in a guide housing arranged in a bore of a housing of the guiding and locking device, and wherein the locking device is formed by a wedge element mounted adjustably in the housing of the guiding and locking device.

21. Safety device according to claim 20, characterised in that the wedge element can be adjusted in adjustment direction of the retaining mechanism in a guide of the housing.

22. Safety device according to claim 21, characterised in that guide tracks of the guide for the wedge element run at an angle to the adjustment direction of the retaining mechanism formed by the guide rail.

23. Safety device according to claim 21, characterised in that the wedge element is supported in the guide by roller elements.

24. Safety device according to claim 20, characterised in that the wedge element can be adjusted into a release position by adjusting means out of a clamped position, in which the retaining mechanism is positioned relative to the housing.

* * * * *